United States Patent
Hudspeth et al.

[11] Patent Number: 6,145,982
[45] Date of Patent: Nov. 14, 2000

[54] EYEGLASS SCREWDRIVER

[76] Inventors: James M. Hudspeth, 90 Avenida Descanso, Oceanside, Calif. 92057; Joshua Freilich, 15 Tano Point La., Santa Fe, N. Mex. 87501

[21] Appl. No.: 09/415,199

[22] Filed: Oct. 7, 1999

[51] Int. Cl.[7] .................................................. G02C 13/00
[52] U.S. Cl. .................. 351/42; 81/451; 81/454
[58] Field of Search .................. 351/158, 41, 42; 81/451, 452, 453, 454, 455, 456, 457, 458, 125

[56] References Cited

U.S. PATENT DOCUMENTS 4,611,515   9/1986   Marbourg, Jr. ........................... 81/451

*Primary Examiner*—Hung Xuan Dang

[57] ABSTRACT

An eyeglass screwdriver has a generally cylindrically shaped body having a first end and a second end with a driver head attached to the first end of the body for screwing in and out screws. A swivelable and rotateable head at the second end allows pressure to be transmitted to the body and driver head. The swivelable and rotateable head includes a ball, a retainer, and a cap to affix the head to the body. The preferred embodiment has the cylindrical body with a bore on axis to the body and a bore perpendicular to the axis of the cylindrical body located so that it intersects the bore on axis of the cylindrical body and further includes a spherical depression on the opposite end of the cylindrical body. There is also a magnet located in the bore to help hold the driver head.

11 Claims, 1 Drawing Sheet

EYEGLASS SCREWDRIVER

BACKGROUND OF THE INVENTION

1. Field of the Invention

This invention relates generally to the field of eyeglasses, and more particularly to an eyeglass screwdriver.

2. Background Art

Eyeglass screwdrivers are typically short screwdrivers of approximately between three and 5 inches in length to allow for greater control when being used with eyeglass frames that typically require relatively detailed craftsmanship. These eyeglass screwdrivers accordingly are used by the craftsman with the head of the screwdriver in the palm of the user's had so that appropriately needed pressure may be applied. Some eyeglass screwdrivers have caps that rotate and some have removable blades. The rotating caps allow the pressure to be placed on the screw being removed while guarding against excessive force being applied that may strip the screw or cause damage to the eyeglass frame. The eyeglass frame and consequently the eyeglass frame screw being worked on may be in any orientation that accommodates easy and effective access to the screw. As the orientation of the eyeglass screwdriver changes, the user applies pressure in sometimes unnatural directions and if many screws need attention, wrist fatigue often occurs and may develop into more serious conditions.

SUMMARY OF THE INVENTION

The primary advantage of the invention is to provide an eyeglass screwdriver that will allow a more natural and less awkward position of the wrist.

In accordance with a preferred embodiment of the present invention, an eyeglass screwdriver comprises a generally elongated body having a first end and a second end, a driver head attached to the first end of the body for screwing in and out screws, a swivelable and rotateable head at the second end through which pressure may be transmitted tot he body and driver head.

Other advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENT

Detailed description of the preferred embodiment is provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
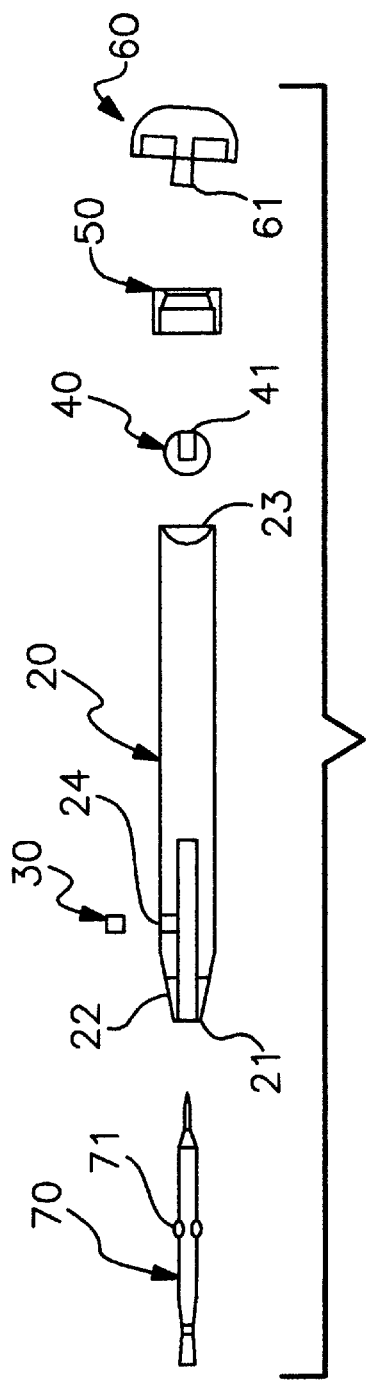
FIG. 1 is an exploded view of the eyeglass screwdriver according to a preferred embodiment of the present invention.
Figure 2:
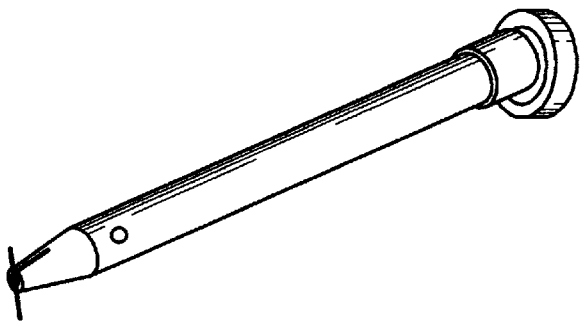
FIG. 2 is a perspective view of the eyeglass screwdriver of FIG. 1.

Turning now to the drawings an eyeglass screwdriver for inserting and removing eyeglass screws with a swiveling rotatable head is shown in FIGS. 1 and 2. Though may be of a variety of shapes including a square cross section or other appropriate shape, a generally elongated body, illustrated as a cylindrical body 20 has at a first end thereof a bore 21 on axis with the body and of a depth sufficient to contain a blade 70. The body has a slot 22 on one end and on a second end thereof, opposite the first end, has a recess 23. Perpendicular to the axis of body 20 and in a location that intersected bore 21 is a cylindrical hole 24 that contains a magnet 30 to help in retaining blade 70 in bore 21 and also may act to magnetically hold a crew that is being inserted or removed for conventional reasons.

Spherical ball 40 is of a size to fit into recess 23 and has a hole 41 sufficient to allow insertion of post 61 extending from the center of cap 60. Retainer 50 slides over body 20 containing ball 40 into recess 23.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An eyeglass screwdriver comprising:
    a generally elongated body having first and second ends;
    a driver head attached to the first end of the body for screwing screws; and
    a swivelable and rotatable head at the second end through which pressure may be transmitted to the body and driver head.

2. An eyeglass screwdriver as claimed in claim 1 wherein the swivelable and rotatable head includes a ball and retainer cap.

3. An apparatus for removing eyeglass screws with a swiveling rotatable head as claimed in claim 2 further comprising a cylindrical retainer.

4. An eyeglass screwdriver as claimed in claim 2 further comprising a cap having a post extending from the center recess of said cap.

5. An eyeglass screwdriver as claimed in claim 1 wherein the body is generally cylindrically shaped.

6. An eyeglass screwdriver as claimed in claim 1 wherein the body has an axis and a slot perpendicular to the axis.

7. An apparatus for removing eyeglass screws with a swiveling rotatable head as claimed in claim 1 wherein said cylindrical body has a bore on axis of said cylindrical body intersected by said slot.

8. An eyeglass screwdriver as claimed in claim 1 wherein the body has an axis and bore perpendicular to the axis located so that it intersects the bore on the axis.

9. An eyeglass screwdriver as claimed in claim 1 further comprising a cylindrical magnet.

10. An eyeglass screwdriver as claimed in claim 1 wherein the ball has a bore to the center of the ball.

11. An eyeglass screwdriver as claimed in claim 1 wherein the cylindrical body has spherical depression on the second end.

* * * * *